United States Patent [19]

Ip

[11] Patent Number: 5,557,468
[45] Date of Patent: Sep. 17, 1996

[54] CHROMATIC DISPERSION COMPENSATION DEVICE

[75] Inventor: Joseph Ip, Kanata, Canada

[73] Assignee: JDS Fitel Inc, Nepean, Canada

[21] Appl. No.: 442,367

[22] Filed: May 16, 1995

[51] Int. Cl.⁶ .................................................. G02B 5/04
[52] U.S. Cl. ................................................ 359/615; 372/32
[58] Field of Search ................... 372/14, 20, 22, 372/29, 32; 359/615

[56] References Cited

U.S. PATENT DOCUMENTS

| | | | |
|---|---|---|---|
| 3,365,539 | 11/1994 | Mooradian | 372/32 |
| 5,124,994 | 6/1992 | Leuchs et al. | 372/32 |
| 5,283,845 | 2/1994 | Ip | 385/24 |

OTHER PUBLICATIONS

"Optical Equalization to Combat the Effects of Laser Chirp and Fiber Dispersion", Journal of Lightwave Technology, vol. 8, No. 5, May 1990, pp. 649–659.

*Primary Examiner*—Timothy P. Callahan
*Assistant Examiner*—Jeffrey Zweizig
*Attorney, Agent, or Firm*—Neil Teitelbaum & Associates

[57] ABSTRACT

A chromatic dispersion compensation device is provided in the form of an etalon having first partially reflecting mirror providing an input and output port for porting a signal into and out of the etalon cavity. A second partially reflective mirror parallel to and spaced apart from the first mirror, being more reflective than the first mirror provides a monitoring port for monitoring energy within the cavity. Means are optionally provided for controlling a parameter related to the cavity in dependence upon a signal ported from the monitoring port. Means may be provided to control a transmitting laser in dependence upon the signal ported from the monitoring port.

20 Claims, 8 Drawing Sheets

PRIOR ART

Fig. 1

$R_0 > R_1$
$R_0 \neq 100\%$

CHROMATIC DISPERSION COMPENSATION DEVICE

FIELD OF THE INVENTION

This invention relates generally to a device for compensation of chromatic dispersion in optical fibers.

BACKGROUND OF THE INVENTION

Conventional laser systems are known to utilize directly modulated semiconductor lasers. In combination with chromatic dispersion characteristics of single-mode optical fiber, chirping of these lasers contributes to the spread of optical pulses and results in intersymbol interference and overall degradation in transmission. Current and "next-generation" high speed systems employ transmitters which use narrow linewidth lasers and external modulators in a window or range of wavelengths about 1550 nm. These external modulators generally have a very low chirp; some designs have a zero or negatively compensating chirp. Nevertheless, transmission distance is still dispersion-limited to about 80 kilometers at transmission rates of 10 Gb/s using conventional single mode fibers.

One solution to this problem is in the use of dispersion shifted fiber which has little dispersion in the 1550 nm window. However, replacing existing fiber with dispersion shifted fiber is costly. Other approaches have been proposed such as optical pulse shaping to reduce laser chirp, using a semiconductor laser amplifier to impose a chirp on the transmitted signal that counteracts the chirping of the directly modulated semiconductor laser.

Approaches that are more consistent with the teachings of this invention attempt to reduce the intersymbol interference at or near the receiver, or intermediate the transmitter and the receiver. Essentially any medium capable of providing a sufficient dispersion opposite to that of the optical fiber can serve as an optical pulse equalizer. For example it is known to use a special optical fiber having an equal chromatic dispersion at a required operating wavelength but opposite in sign to that of the transmitting fiber. Other methods include the use of chirped fiber Bragg gratings, and the use of planar lightwave circuit (PLC) delay equalizers. Unfortunately, special compensating fiber has a very high insertion loss and in many applications is not a preferable choice. Fiber gratings are generally not practical for field applications due to their narrow bandwidth, and fixed wavelength. PLCs ate also narrow band, although tunable devices; fabricating a PLC with large dispersion equalization remains to be difficult.

In a paper entitled "Optical Equalization to Combat the Effects of Laser Chirp and Fiber Dispersion" published in the Journal of Lightwave Technology. Vol. 8, No. 5, May 1990, Cimini L. J. et al. describe an optical equalizer capable of combating the effects of laser chirp and fiber chromatic dispersion on high-speed long-haul fiber-optic communications links at 1.55 μm. Also discussed is a control scheme for adaptively positioning the equalizer response frequency. Cimini et al. describe a device having only one common input/output port at a first partially reflective mirror and a second 100% reflective mirror together forming a cavity. The control scheme described attempts to track signal wavelength by obtaining feedback from a receiver. The amplitude response of the equalizer is essentially flat with wavelength at the input/output port, and thus, the proposed control scheme is somewhat complex requiring processing of high speed data at the optical receiver. As well, the proposed control method is stated to function with RZ signals but not with NRZ signals, a more commonly used data format. Although the equalizer described by Cimini et al. appears to perform its intended basic dispersion compensating function, there exists a need for an improved method of control of the position of the equalizer frequency response, and as well, there exists a need for an equalizer that will provide a sufficient time shift over a broader range of wavelengths.

Hence, it is an object of this invention to overcome some of the limitations of the prior art described above. Furthermore, it is an object of the invention to provide a device that will compensate for dispersion over a relatively broad range of wavelengths.

SUMMARY OF THE INVENTION

In accordance with the invention, a device is provided for dispersion compensation comprising an etalon having first and second partially reflective mirrors in a parallel spaced relationship to form a gap between the mirrors, the first partially reflective mirror being substantially less reflective than the second mirror to allow substantially most of an input signal to pass through the first partially reflective mirror, the first mirror having an input/output port for providing the input signal to the gap between the mirrors, the second mirror having at least a region thereof that allows a substantially small amount of the input signal to pass therethrough for providing a monitoring port, said monitoring port being substantially optically aligned with said input port.

In accordance with the invention, there is further provided, a two port device for dispersion compensation comprising: a first partially reflective mirror; a second partially reflective mirror having a substantially greater reflectivity than the first mirror, the first and second mirrors being in a parallel spaced relationship defining an optical cavity, first mirror having a single input/output port and the second mirror having a single output monitoring port substantially axially aligned with the first input/output port.

In accordance with another aspect of the invention, a device for dispersion compensation is provided, comprising: at least two etalons, a first of the two etalons having first and second reflective mirrors in a parallel spaced relationship, to form a gap between the mirrors, the first mirror being partially reflective and having a predetermined reflectivity to allow an input signal to pass therethrough to the gap between the parallel mirrors, and a second etalon, the second etalon having a first mirror and second mirror, said first mirror having a predetermined reflectivity that is dissimilar from the reflectivity of the first reflective mirror, the first and second mirrors of the second etalon being in a parallel spaced relationship to form a gap between the mirrors, the first and second etalons being arranged in series so that most of a signal launched into the first etalon later propagates into the second etalon after traversing the first etalon.

Advantageously, the invention provides a device with a monitor port on the transmitted side of the etalon. Furthermore, the amplitude response of the monitor (transmitted) port provides a much higher signal contrast ratio (on/off ratio or extinction ratio), than the output (reffected) port. Thus a relatively simple, local, control scheme can be implemented, obviating the more complex high speed detection and signal processing schemes suggested in the prior art.

Another advantage of this invention is that the local control scheme allows the compensation device (etalon) to be located virtually anywhere in the system, even at the transmitter end.

BRIEF DESCRIPTION OF THE DRAWINGS

Exemplary embodiments of the invention will be described in conjunction with the drawings in which.

DETAILED DESCRIPTION

Figure 1:
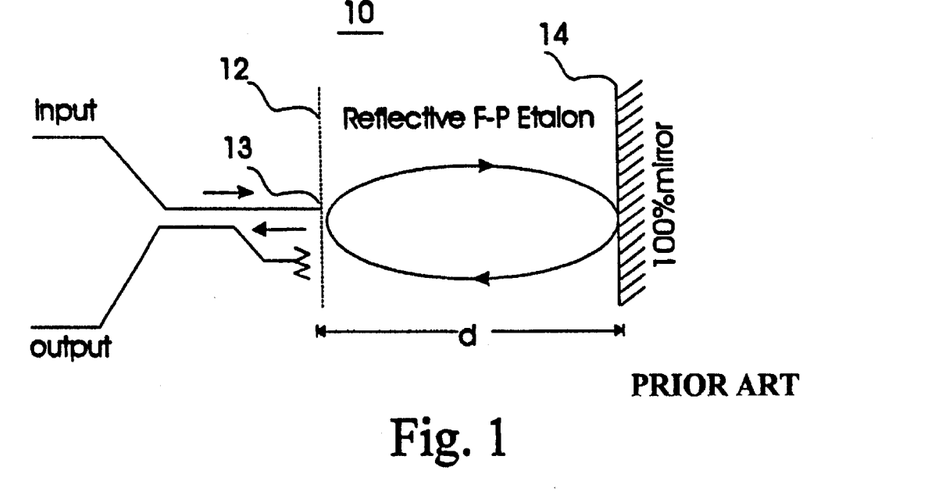
FIG. 1 is a schematic illustration of a prior art single port dispersion equalization device.

Referring now to FIG. 1, a dispersion compensation equalizer 10 having reflective Fabry-Pérot (FP) etalon is shown having a first partially reflective mirror 12 spaced apart and parallel with a 100% reflective second mirror 14 shown. The first mirror provides a single input/output port 13 to allow light to be launched into and out of the cavity defined by the mirrors 12 and 14. The equalizer is described by Cimini et al. as an "all pass" network whose amplitude response is flat and whose phase response is designed to counter the effect of the transmission fiber's quadratic phase response. Since the amplitude response is flat, it very difficult to extract information from a signal on return from the cavity for use as control signal for cavity adjustment. In order to transform the reflective etalon to a transmissive structure, various implementations are possible. For example, a 3-dB coupler (shown) or a polarization independent optical circulator (not shown) is proposed. However, it is generally accepted that a coupler would result in about 6 dB of round-trip loss while a circulator would result in about 3 dB of loss.

The frequency response of a single-cavity equalizer is:

$$H_{eq}(\omega) = A \frac{1 + re^{j\omega t}}{1 + re^{-j\omega t}} = Ae^{j\psi(\omega)} \quad (1)$$

where $$\psi(\omega) = 2\tan^{-1}\left[\frac{r\sin\omega T}{1 + r\cos\omega T}\right] \quad (2)$$

the power reflectivity of the front mirror is $r^2$; T is the round-trip delay of the single cavity; and $A(\leq 1)$ is constant representing the all-pass loss of the particular structure. The term $\exp(-j\omega T)$ is omitted from the equation. The delay response from equation (2) is:

$$\tau(\omega) = \frac{-d\psi(\omega)}{d\omega} = -2rT\frac{r + \cos\omega T}{1 + r^2 + 2r\cos\omega T} \quad (3)$$

which is periodic in frequency, with a period of 1/T Hz.

Figure 2:
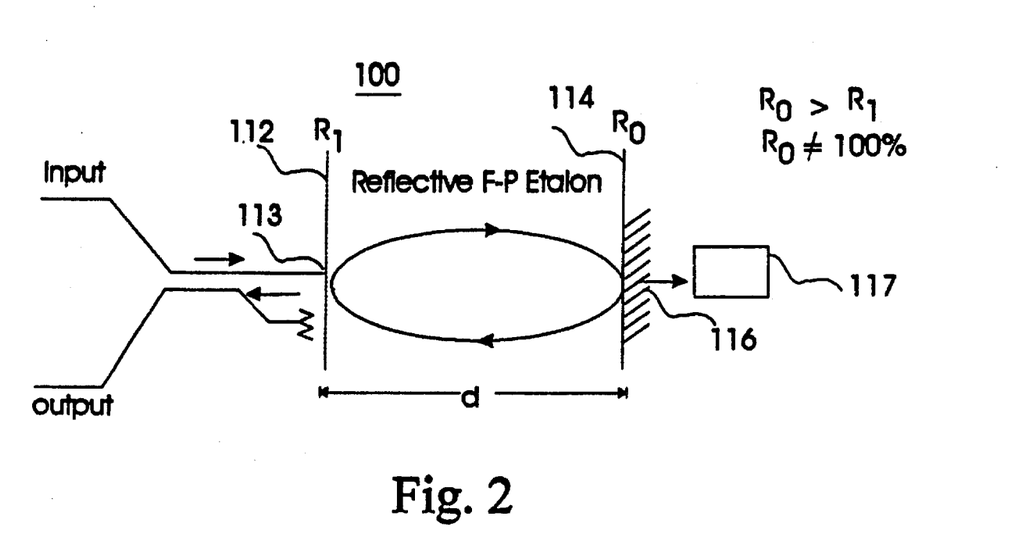
FIG. 2 is a schematic illustration of a two port dispersion equalization device in accordance with this invention.
Figure 4:
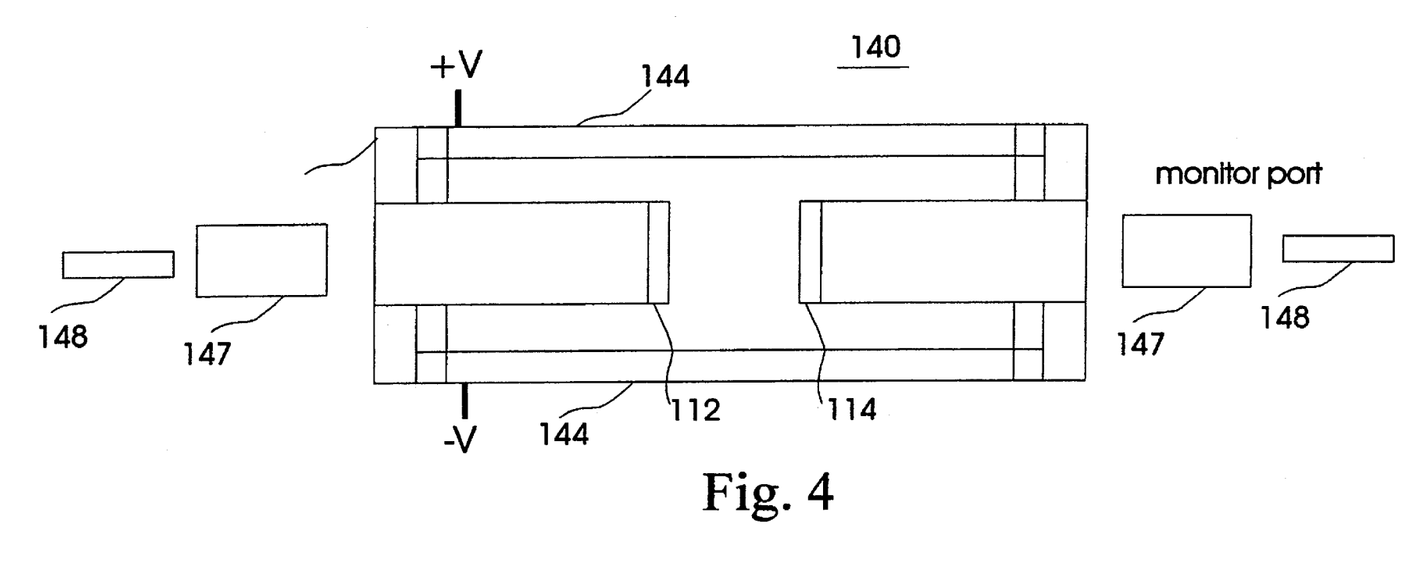
FIG. 4 is a block diagram of a two port equalizer in accordance with this invention having a piezo-electric actuator for adjusting cavity length.

Referring now to FIG. 2 a single stage two port equalizer 100 in accordance with an exemplary embodiment of this invention is shown. The equalizer 100 is comprised a first mirror 112 with a reflectivity $R_1=55\%$ and a second mirror 114 having a reflectivity $R_0=99\%$. The first mirror has an input output port 113 for porting light into and out of the cavity formed by the mirrors. The second mirror 114 includes at least a region where the reflectivity is less than 100%; this region provides an output port 116 to allow a small amount of the light energy to be to be ported out of the cavity. Of course, coupling means in the form of a lens or photodetector 117 may be provided for coupling light out of the port 116. It is preferable that the output port 116 be at least optically aligned with the input/output port where light enters the cavity. The output port 116 can be used for a variety of purposes, for example, monitoring the presence or absence of energy within the cavity; more importantly the transmitted signal appearing at the output port 116 can be monitored and utilized for locking to and tracking the frequency of the transmitting laser. The spectral response of the transmitted signal at the monitor port is periodic in behaviour; thus the amplitude of the monitor output signal varies with wavelength in a periodic manner. Control circuitry can change the round-trip delay time between the mirrors by adjusting the cavity length in dependence upon the laser frequency. For example if the frequency of the transmitting laser varies or drifts, the cavity can be dynamically tuned. Referring now to FIG. 4, an FP etalon 140 is shown having a piezo electric actuator 144 for adjusting the cavity length between the first and second mirrors 112 and 114. A lens 147 couples a fiber 148 to the etalon The piezo electric actuator can be controlled in dependence upon a characteristic of a signal monitored at the output monitor port.

Several schemes, some mentioned heretofore, have been considered for adaptively positioning the frequency response of the one port equalizer described by Cimini et al. in the prior art; however, since these schemes are limited to the single port equalizer proposed by Cimini et al., these schemes are limited to the information content of the corrected signal at the single input/output port. Furthermore they are not known to work for NRZ signals. As was previously mentioned, the amplitude response of this signal is substantially flat with optical frequency offset. Thus, this has been found not to be a preferable monitoring location. Alternatively, and in accordance with the invention, surprisingly, by tapping some of the light energy out of the cavity at the output port 116 of the two port device 100, a control and monitoring signal is provided which requires a far less sensitive detection scheme than those described in the prior art related to a single port device 10.

In operation, when the signal transmitted from a laser enters the cavity of the equalizer 100, a small fraction of the input signal is provided at the output monitoring port 116. The monitor signal power varies substantially with wavelength and its value depends upon how near the signal wavelength is to the resonant wavelength of the cavity. Having the option of direct monitoring of the signal at port 116, allows the equalizer 100 to be located virtually anywhere in the system. By locating the equalizer 100 near or at the transmitter, a precompensation scheme can be employed and, for example, noise and non-linear effects of fiber can be minimized when an optical fiber amplifier is also deployed in the system. Furthermore, and perhaps more importantly, the monitor (feedback) signal may be utilized to control the transmitting laser, thus locking the transmitter wavelength to the optimum operating wavelength of the equalizer 100.

Figure 3:
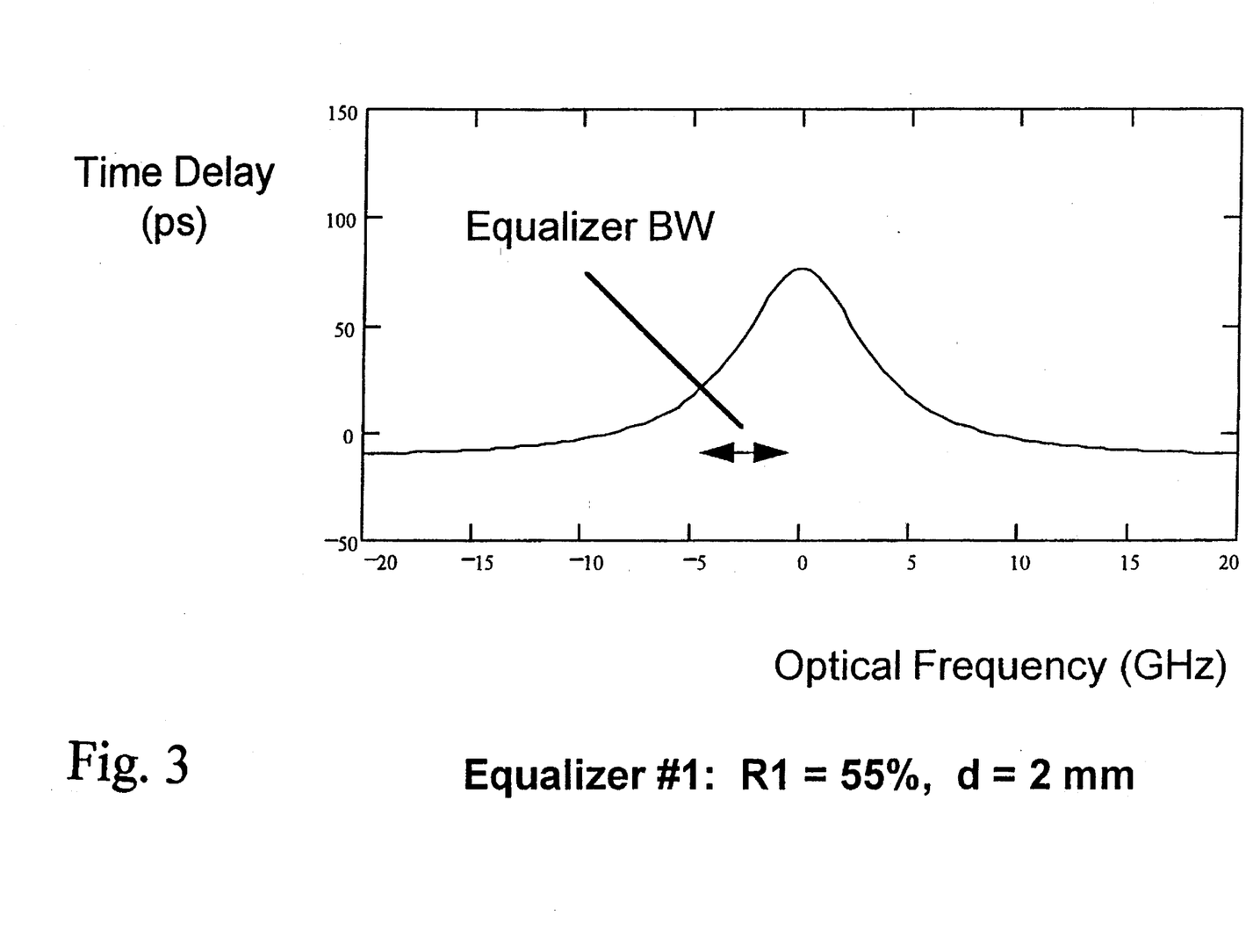
FIG. 3 is graph of time delay versus optical frequency illustrating the response of the equalizer shown in FIG. 2.
Figure 5:
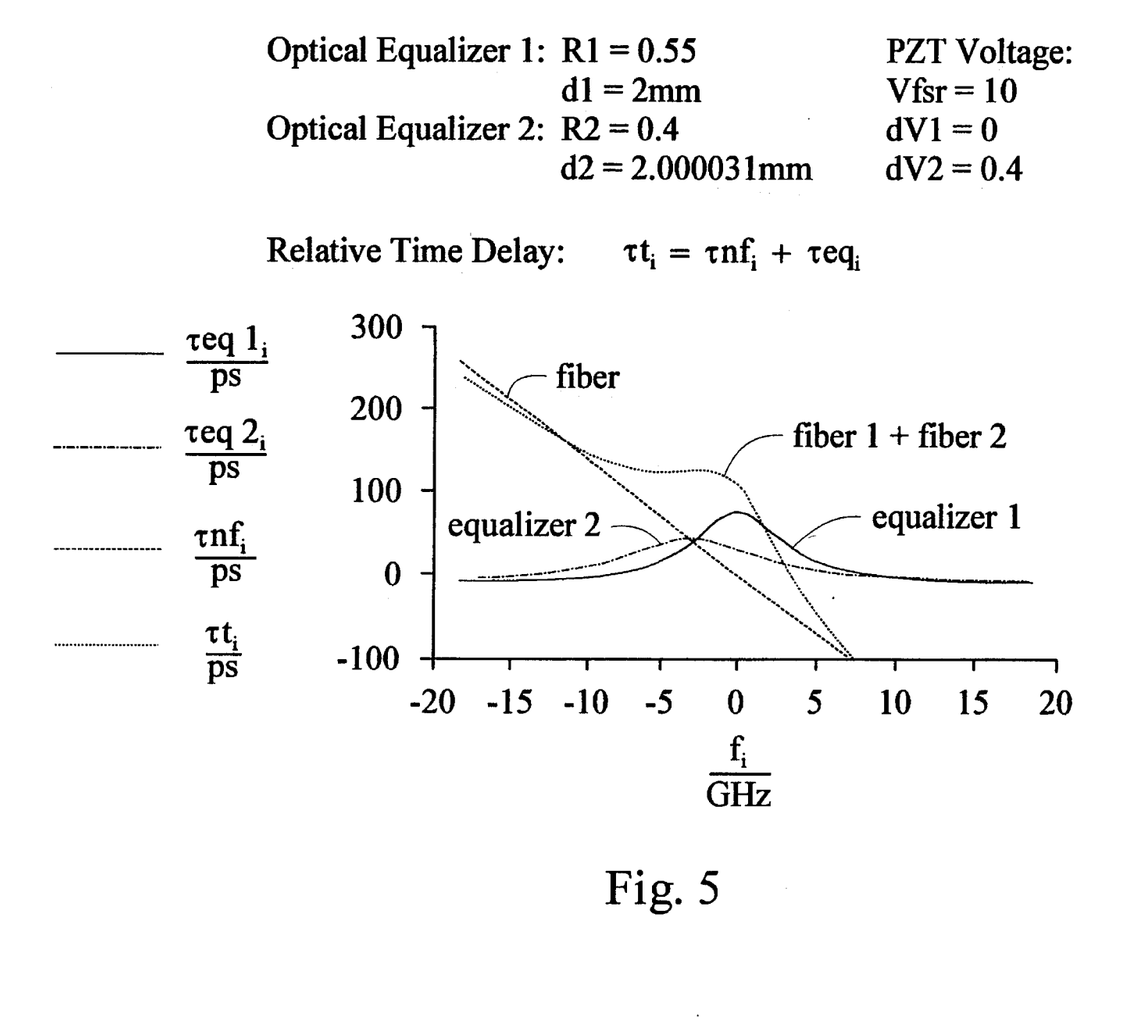
FIG. 5 is a graph showing the output response of two equalizers; superimposed on the graph is straight line showing the dispersion in an optical fiber as a function of frequency, and the combined response of the two equalizers including optical fiber.

Turning now to FIG. 3, the output response is shown for the equalizer 100; the graph illustrates frequency response of time delay in picoseconds. The approximately 5 Ghz bandwidth portion of the response indicated by the two-headed arrow demarks the desired operating region of the filter which counteracts the dispersion in the same optical frequency range. This is more clearly illustrated in the graph of FIG. 5. The straight, dotted line shows time delay over a 20 Ghz frequency band (with a negative slope) due to dispersion in an optical fiber after 100 Km transmission. The preferred operating regions of the filter shown heretofore in accordance with this invention is limited in bandwidth. For example, as is shown in FIGS. 3 and 5, the operating region of the filter, i.e. the positive sloped portion of the equalizer's response, is limited to a 5 Ghz bandwidth. Of course, it would be preferable to be able to extend this region without a negative trade-off in relative time delay.

Figure 6:
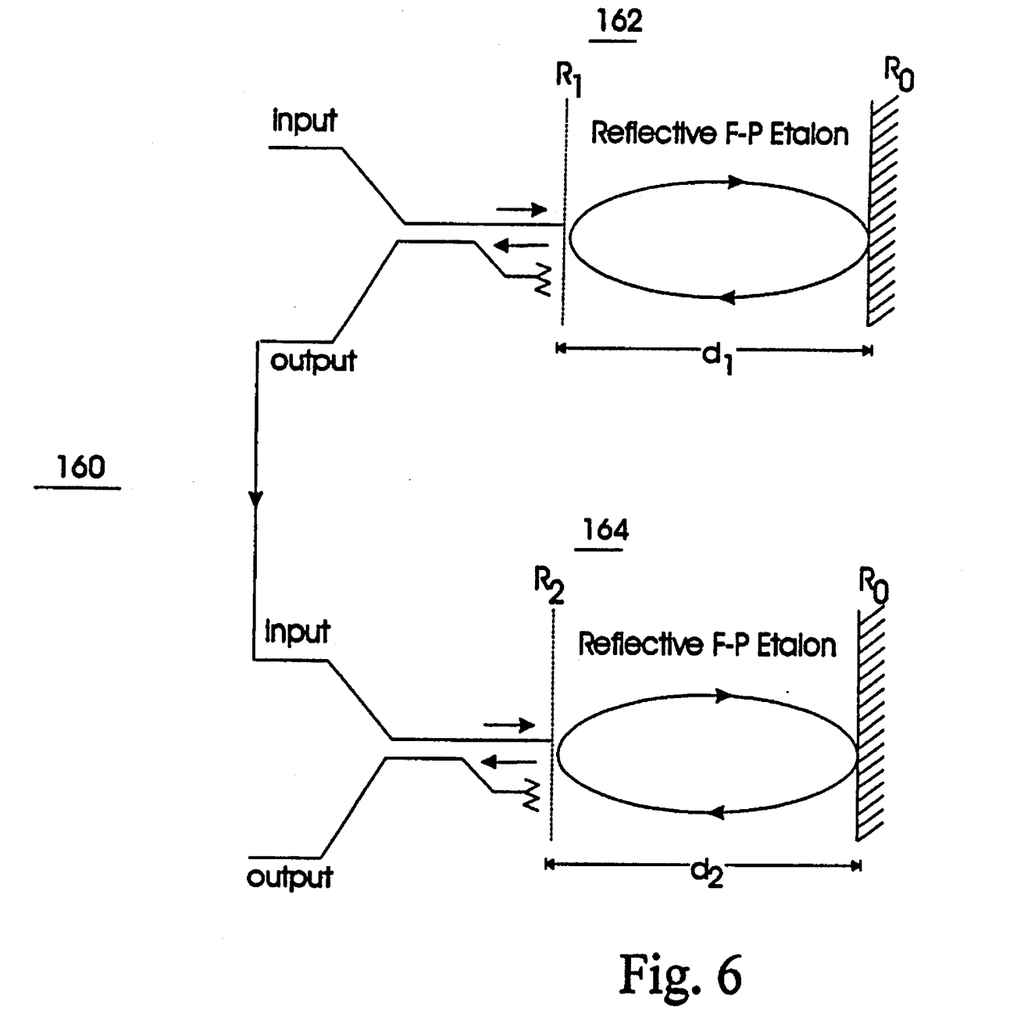
FIG. 6 is schematic illustration an alternative embodiment showing a two stage cascaded equalizer.
Figure 7:
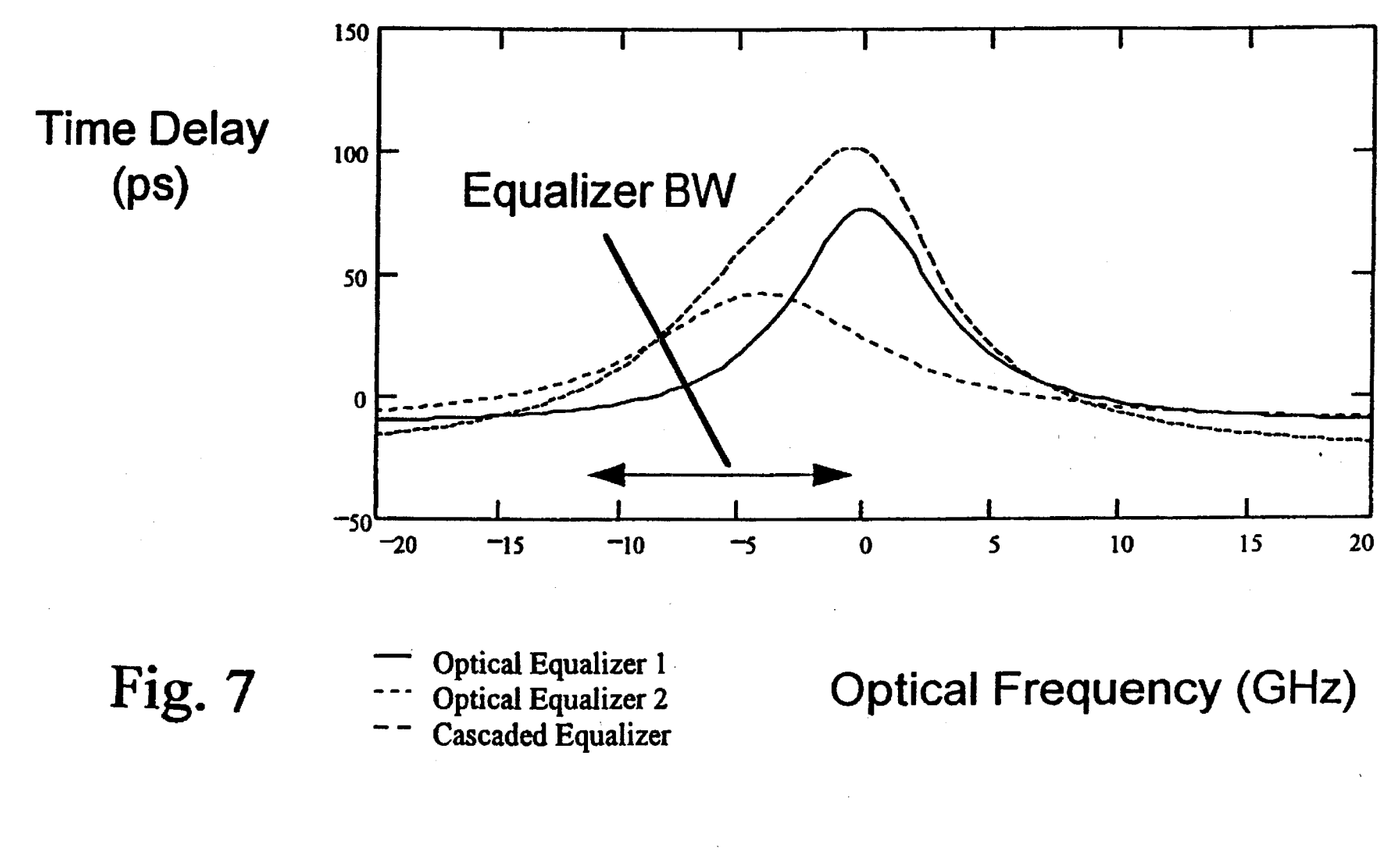
FIG. 7 is a graph showing the output response for the two stage equalizer of FIG. 6.

By changing the reflectivity of the less reflective input/output mirror 112 from a higher to lower reflectivity the equalizer's delay and bandwidth response undesirably move apart. Unfortunately, as the delay response increases the frequency range over which the equalizer operates decreases. Cascading two filters having the same reflectivity on the input/output mirrors has been suggested, but does not produce optimum results with respect to increasing the wavelength region over which the equalizer operates; However, in accordance with this invention, it has been found that by cascading the etalon 110 shown in FIG. 2 with another etalon having dissimilar reflectivity characteristics and being slightly offset in its center frequency response, it is possible to favourably extend the range of of the output response of the filter considerably, with respect to both time delay and in operating wavelengths. An etalon equalizer 160 in accordance with this invention having two dissimilar cascaded etalons 162 and 164 is shown in FIG. 6. The output response for each of the etalons 162 and 164 and the output response for the cascaded equalizer 160 is shown in FIG. 7. By cascading the etalons, the operating wavelength is doubled from 5 to 10 Ghz and the time delay is increased by about 25 percent. The first stage etalon (cavity) 162 has a first mirror with a reflectivity $R_1=55\%$ serving as an input/output port; the second stage etalon (cavity) 164 has a first mirror with a reflectivity $R_2=38\%$. The nominal distance "d" between first and second mirrors in each cavity is 2 mm. As is shown in FIG. 7, the offset of the center operating wavelength of each of the cavities is approximately 5 Ghz which corresponds to a small difference in cavity spacing ($d_1 \neq d_2$). In order to enhance the performance of the cascaded equalizer 160, it is preferable to include a monitoring port on at least one of the second mirrors of one of the cavities, similar to the monitoring port described earlier. Of course more than two dissimilar stages can be cascaded to provide an equalizer with particular operating characteristics.

Figures 8, 8B:
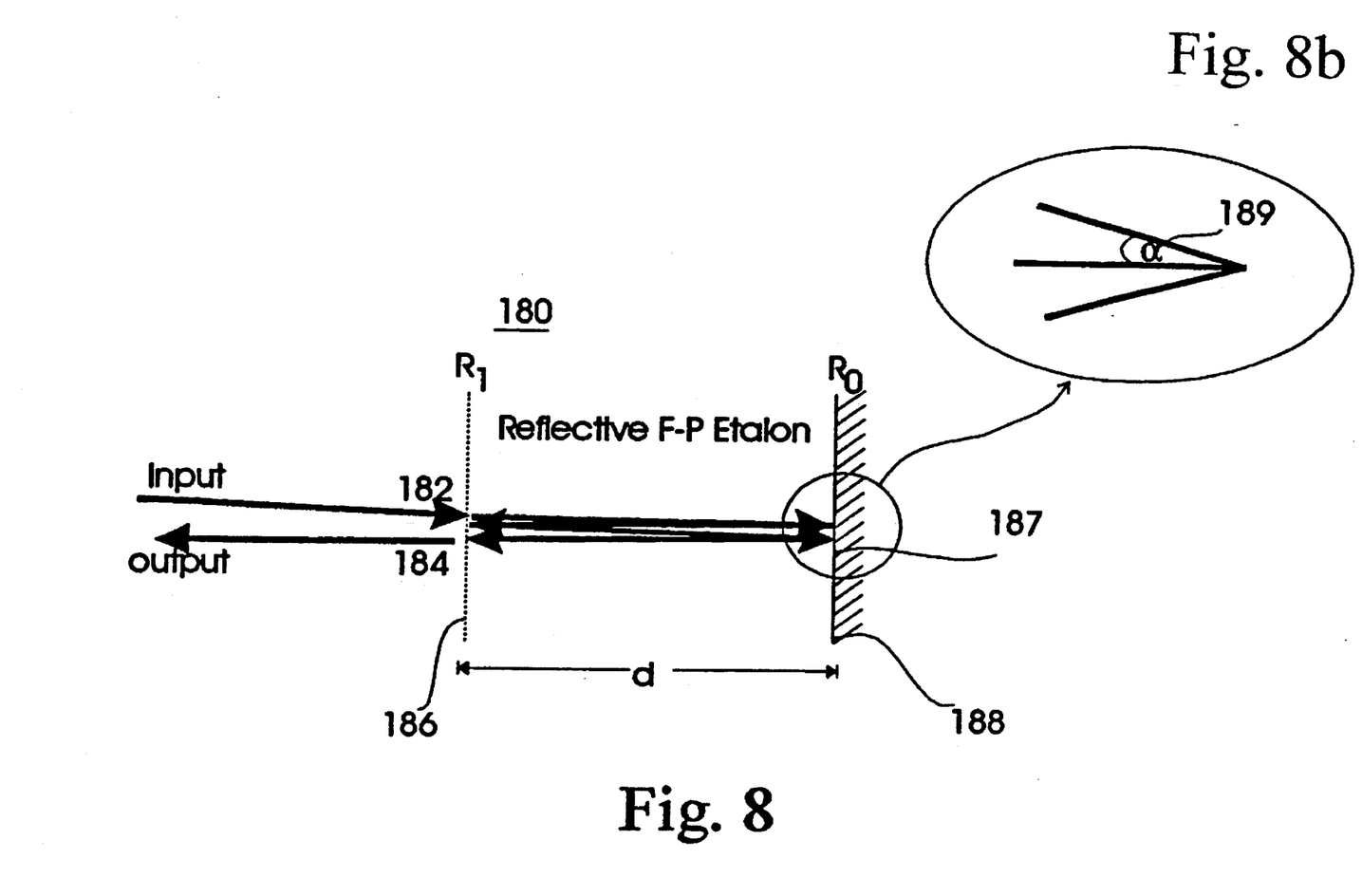
FIG. 8 is schematic illustration of an alternative embodiment of an equalizer having 3 ports; and, FIG. 9 is a pictorial side view of a block of solid transparent material coated on opposite end faces with a reflective coating forming a two port etalon.

In yet another embodiment of this invention shown in FIG. 8, a single stage device 180 (or cascaded multistage device) is provided having separate input and output ports 182 and 184 respectively, on the first mirror 186 of the cavity. By providing separate and input output ports 182 and 184 at the first partially reflective mirror, light is coupled into and out of the equalizer with considerably less signal power loss than with the 3-dB coupler or a polarization optical circulator proposed by Cimini et al. in the prior art.

Of course, in order have the light coupled into the cavity circulate within the cavity, it is necessary for the fold angle 189 at the second mirror 188 between the input port and output port to be small, and nearly equal to but greater than zero degrees. Essentially the fold angle must be small enough such that the lateral beam offset after each reflection (round trip within the cavity) is much smaller than the diameter of the beam. This ensures that the "beam walk-off" is small after a large number &reflections and that most of the signal power can be captured by the output port 184. As in the other embodiments of this invention, a monitoring port 187 is preferably provided at the second mirror to provide signal for use in controlling the cavity.

Figure 9:
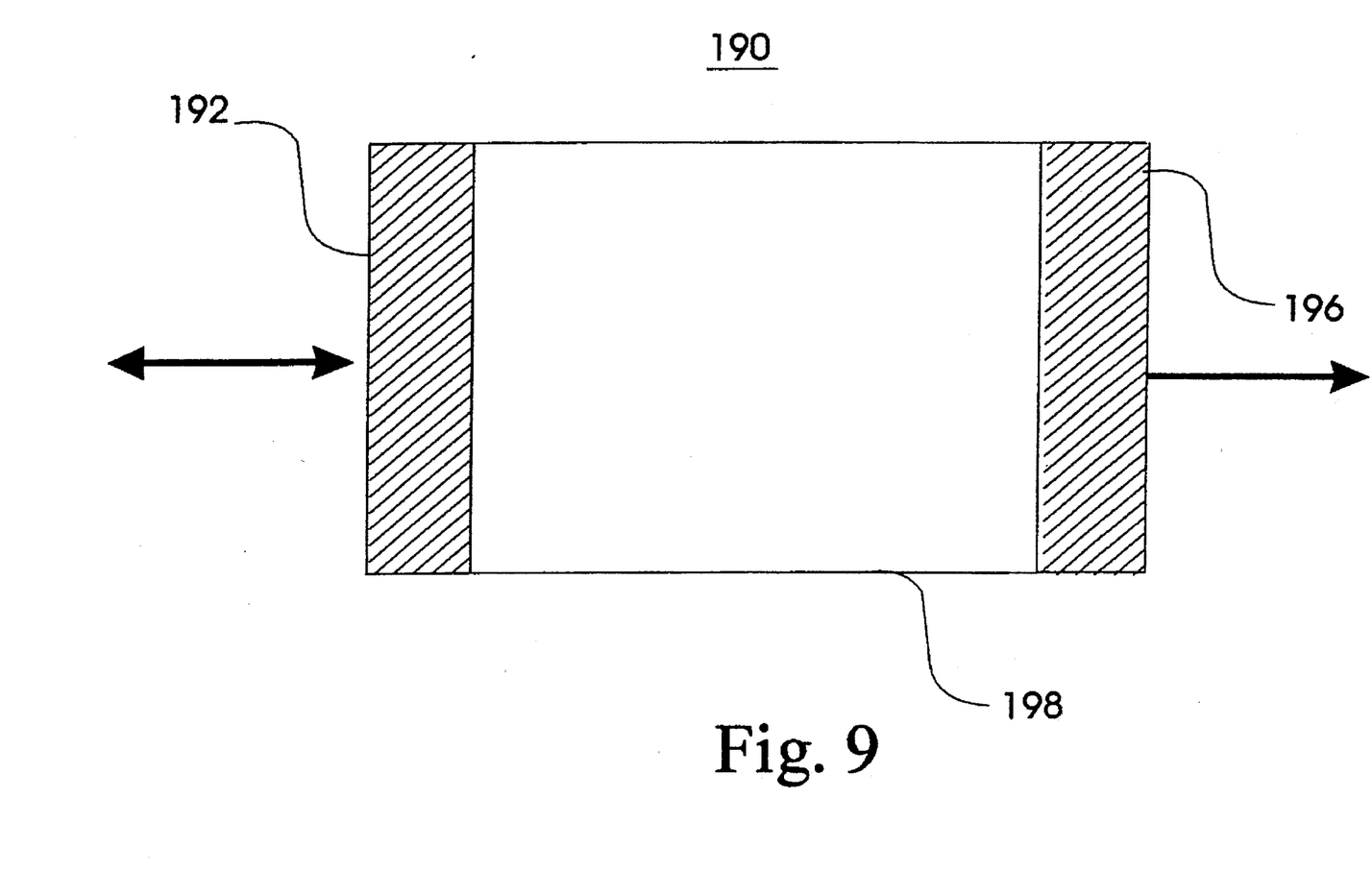

Turning now to FIG. 9 an etalon 190 in the form of a transparent block of glass 198 is shown having a first partially reflective coating 192 and a second coating 196 spaced apart in a parallel with the first reflective coating 192 on opposite end faces of the block 198. The block 198 together with the coatings, form an two port optical cavity 190 in accordance with this invention. In all of the embodiments described heretofore, the cavity may be filled with air, liquid, or as shown in the embodiment of FIG. 9, may be a transparent solid material having reflecting surfaces at opposite ends.

Numerous other embodiments may be envisaged without departing from the spirit and scope of the invention.

What I claim is:

1. A device for dispersion compensation for providing an output signal that varies in time delay with respect to wavelength, and which is substantially non-varying in amplitude with respect to wavelength, in a predetermined range of wavelengths, the device comprising:

an etalon having first and second partially reflective mirrors in a parallel spaced relationship, to form a gap between the mirrors, the first partially reflective mirror being substantially less reflective than the second mirror to allow substantially most of an input signal to pass through the first partially reflective mirror, the first mirror having an input/output port for providing the input signal to the gap between the mirrors, the second mirror having at least a region thereof that al lows a substantially small amount of the input signal to pass therethrough for providing a monitoring port, said monitoring port being substantially optically aligned with said input port, the first mirror having a reflectivity that is less than 90% and the second mirror having a reflectivity that is greater than 97% and less than 100%.

2. A device as defined in claim 1 further including means coupled to the monitoring port for detecting a characteristic of a monitoring signal derived from the input signal.

3. A device as defined in claim 1, further comprising:

a second etalon having first and second partially reflective mirrors in a parallel spaced relationship, to form a gap between the mirrors, the first partially reflective mirror being substantially less reflective than the second mirror to allow substantially most of an input signal to pass through the first partially reflective mirror, the first mirror having an input/output port for providing the input signal to the gap between the mirrors, the second mirror having at least a region thereof that allows a substantially small amount of the input signal to pass therethrough for providing a monitoring port, said monitoring port being substantially optically aligned with said input port, the first and second etalons having their input/output ports arranged in series so that most of a signal launched into the first etalon later propagates into the second etalon after traversing the first etalon.

4. A device as defined in claim 3, wherein a distance $d_1$ between the parallel spaced mirrors of the first etalon is not equal to a distance $d_2$ between the parallel spaced mirrors of the second etalon.

5. A device as defined in claim 4, wherein the first mirror of the first etalon has a reflectivity $R_1$ which differs from a reflectivity $R_2$ of the first mirror of the second etalon.

6. A device as defined in claim 1, including means for varying the optical distance between the mirrors in dependence upon a control signal provided at the monitoring port.

7. A device as defined in claim 1, wherein the etalon is comprised of a block of light transmitting material, and wherein the first and second partially reflective mirrors are coated on end faces of the block.

8. A device for dispersion compensation for providing an output signal that varies in time delay with respect to wavelength, and which is substantially non-varying in amplitude with respect to wavelength, in a predetermined range of wavelengths, the device comprising:

an etalon having first and second partially reflective mirrors in a parallel spaced relationship, to form a gap between the mirrors, the first partially reflective mirror being substantially less reflective than the second mirror to allow substantially most of an input signal to pass through the first partially reflective mirror, the first mirror having a separate input and output port, the input port for providing the input signal to the gap between the mirrors, and the output port for receiving substantially most of the input signal passed through the input port, the input and output ports on the first mirror being adjacent to one another such that an optical beam launched into the input port and reflecting from the second mirror into the output port of the first mirror has a fold angle greater than but near zero degrees, the first mirror having a reflectivity that is less than 90%, the second mirror having at least a region thereof that allows a substantially small amount of the input signal to pass therethrough for providing a monitoring port, said monitoring port being substantially optically aligned with said input port, the second mirror having a reflectivity that is greater than 97% and less than 100%.

9. A device as defined in claim 3, further comprising a second etalon, the second etalon having first and second partially reflective mirrors in a parallel spaced relationship, to form a gap between the mirrors, the first partially reflective mirror being substantially less reflective than the second mirror to allow substantially most of an input signal to pass through the first partially reflective mirror, the first mirror having a separate input and output port, the input port for providing the input signal to the gap between the mirrors, and the output port for receiving substantially most of the input signal passed through the input port, the input and output ports on the first mirror being adjacent to one another such that an optical beam launched into the input port and reflecting from the second mirror into the output port of the first mirror has a fold angle greater than but near zero degrees, the first and second etalons connected in series such that the input port of one of the etalons is connected to the output port of the other etalon.

10. The device as defined in claim 9, wherein the second mirror of the second etalon has at least a region thereof that allows a substantially small amount of the input signal to pass therethrough for providing a monitoring port, said monitoring port being substantially optically aligned with said input port.

11. A device as defined in claim 9, wherein a distance $d_1$ between the parallel spaced mirrors of the first etalon is not equal to a distance $d_2$ between the parallel spaced mirrors of the second etalon.

12. A device as defined in claim 9, wherein the first mirror of the first etalon has a reflectivity $R_1$ which differs from a reflectivity $R_2$ of the first mirror of the second etalon.

13. The device as defined in claim 8, further comprising a second etalon having first and second partially reflective mirrors in a parallel spaced relationship, to form a gap between the mirrors, the first partially reflective mirror being substantially less reflective than the second mirror to allow substantially most of an input signal to pass through the first partially reflective mirror, the first mirror having an input/output port for providing the input signal to the gap between the mirrors, the first and second etalons being connected in series.

14. The device as defined in claim 13 wherein the second mirror of the second etalon has at least a region thereof that allows a substantially small amount of the input signal to pass therethrough for providing a monitoring port, said monitoring port being substantially optically aligned with said input port.

15. A device as defined in claim 13, wherein a distance $d_1$ between the parallel spaced mirrors of the first etalon is not equal to a distance $d_2$ between the parallel spaced mirrors of the second etalon.

16. A device as defined in claim 13, wherein the first mirror of the first etalon has a reflectivity $R_1$ which differs from a reflectivity $R_2$ of the first mirror of the second etalon.

17. A device as defined in claim 8, including means for varying the optical distance between the first and second mirrors in dependence upon a control signal provided at the monitoring port.

18. A two port device for dispersion compensation comprising:

a first partially reflective mirror having a reflectivity that is less than 90%;

a second partially reflective mirror having a substantially greater reflectivity than the first mirror which is greater than 97% and less than 100%, the first and second mirrors being in a parallel spaced relationship defining an optical cavity, first mirror having a single input/output port and the second mirror having a single output monitoring port substantially axially aligned with the first input/output port.

19. A device as defined in claim 18 comprising detection means coupled to the monitoring port for detecting a characteristic of an optical signal that has passed through the ports.

20. A device as defined in claim 19, wherein the detection means provides opto-electrical conversion.

* * * * *

UNITED STATES PATENT AND TRADEMARK OFFICE
CERTIFICATE OF CORRECTION

PATENT NO. : 5,557,468
DATED : September 17, 1996
INVENTOR(S) : Joseph Ip

It is certified that error appears in the above-indentified patent and that said Letters Patent is hereby corrected as shown below:

Column 6, line 9, "&reflections" should read   --of reflections--.

Column 6, line 41, "al lows" should read   - allows -

Column 7, line 43, "claim 3" should read   - claim 8 -

Signed and Sealed this

Twenty-first Day of January, 1997

Attest:

BRUCE LEHMAN

*Attesting Officer*           *Commissioner of Patents and Trademarks*